United States Patent [19]
Allonby

[11] Patent Number: 5,882,272
[45] Date of Patent: Mar. 16, 1999

[54] LOCKING DIFFERENTIAL

[75] Inventor: Nathan Allonby, Newcastle on Tyne, United Kingdom

[73] Assignee: Caterpillar Inc., Peoria, Ill.

[21] Appl. No.: 937,983

[22] Filed: Sep. 26, 1997

[51] Int. Cl.$^6$ ........................................ F16H 1/44
[52] U.S. Cl. .................. 475/86; 474/84; 474/249
[58] Field of Search ................ 475/86, 84, 249

[56] References Cited

U.S. PATENT DOCUMENTS

| | | | |
|---|---|---|---|
| 3,899,938 | 8/1975 | Crabb | 475/86 |
| 3,973,450 | 8/1976 | Shealy | 475/86 |
| 4,462,271 | 7/1984 | Stieg | 475/86 |
| 4,583,424 | 4/1986 | von Hiddessen et al. | |
| 4,625,584 | 12/1986 | Onodera | 475/86 X |
| 5,117,956 | 6/1992 | Tsujita | 475/249 X |
| 5,176,590 | 1/1993 | Haydock | 475/249 |
| 5,431,603 | 7/1995 | Aho | 475/84 |

FOREIGN PATENT DOCUMENTS

| | | |
|---|---|---|
| 0 598 234 | 5/1994 | European Pat. Off. |
| 1474518 | 5/1977 | United Kingdom. |

*Primary Examiner*—Dirk Wright
*Assistant Examiner*—Peter T. Kwon
*Attorney, Agent, or Firm*—John J. Cheek

[57] ABSTRACT

A locking differential has a fixed drive dog and a movable drive dog. A locking actuator has a plunger drivingly connected to the movable drive dog. The plunger is movable in a first direction to a lock position in which the drive dogs are engaged and in a second, opposite direction to an unlock position in which the drive dogs are disengaged. A piston is connected to the plunger and disposed in a cavity in a housing. Movement of the piston in the second direction is imparted to the plunger when the plunger is in the lock position but the piston is movable independently relative to the plunger in the first direction when the plunger is in the unlock position. A pressurized fluid causes the piston, and thereby the plunger, to move in the second direction. A piston bias member biases the piston in the first direction, and a plunger bias member biases the plunger in the first direction. A related method of locking the differential is also disclosed.

24 Claims, 4 Drawing Sheets

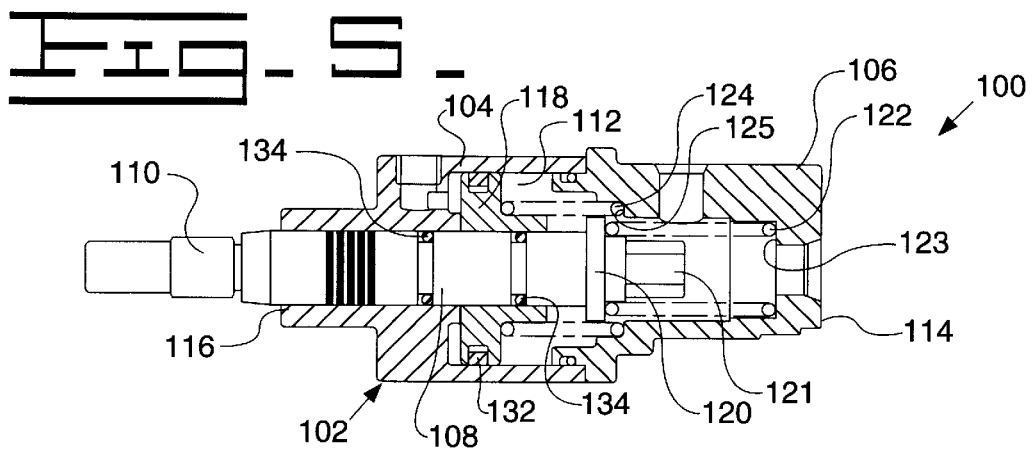
Fig. 5.
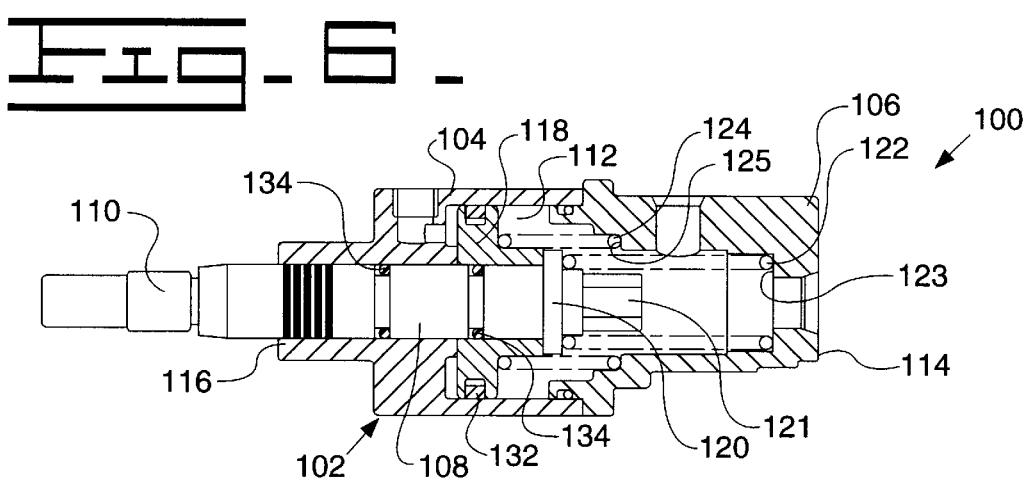
Fig. 6.
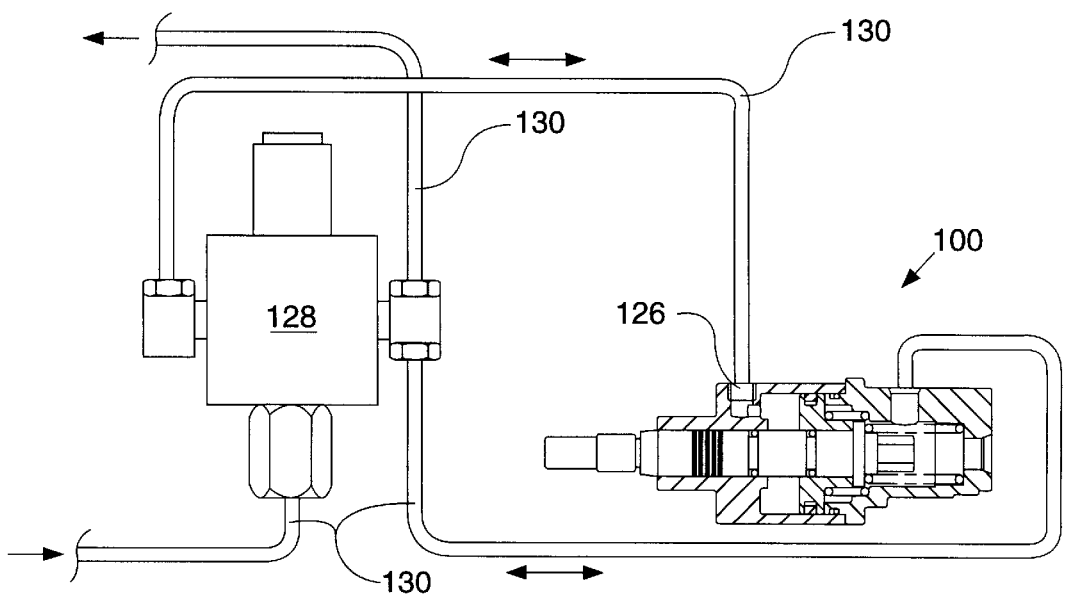

dance with this invention utilizing a locking actuator in
LOCKING DIFFERENTIAL

TECHNICAL FIELD

This invention relates a locking differential for a wheel-driven machine and, more particularly, to an actuator and method for locking and unlocking the differential.

BACKGROUND ART

Wheel-driven machines, such as dump trucks for example, are typically provided with at least one inter-axle differential, commonly referred to as an "open differential", having a carrier or differential housing and two output shafts or half shafts that each drives one wheel of the machine. As well known, the differential utilizes a gear system that permits the output shafts, and thereby the driven wheels, to rotate at different speeds, thereby reducing transmission loads and understeering during normal cornering. In a machine with front and rear driven axles, each driven axle is typically provided with an open differential, and torque is transmitted to the driven axles through a transfer case interconnecting the axles. The transfer case is generally provided with a so-called center differential to accommodate differences in rotational speed between different axles and the wheels driven thereby.

Under slippery or otherwise poor surface conditions, however, open differentials may result in a loss of traction. As well known, if one wheel or axle driven through the differential loses traction, the other wheel or axle loses input torque. Therefore, known differentials are commonly provided with a differential lock to selectively neutralize the normal differential action by locking the output shafts to the differential housing. For example, a dog-clutch locking arrangement has been provided in known spur-type differentials and includes a fixed drive dog connected to and rotating with the differential housing and a slidable drive dog rotating with but slidable along one output shaft. When the drive dogs are not mutually engaged, the differential operates as a conventional open differential. When the drive dogs are mutually engaged, the output shaft connected to the slidable drive dog is locked to the differential housing and the other output shaft is indirectly locked to the differential housing via the planetary gearing of the differential.

To control the locking and unlocking of the differential, the slidable drive dog is connected to the plunger of a hydraulic actuator mounted on the differential casing. The drive dogs are disengaged by applying hydraulic pressure ahead of a piston fixed to the plunger to retract the plunger and separate the drive dogs. To lock the differential, the hydraulic pressure is removed, and a spring forces the piston and the plunger to an extended position whereby the slidable drive dog is moved into engagement with the fixed drive dog, thereby locking the differential.

A problem arising in the use of such known locking arrangements is that, when the hydraulic pressure ahead of the piston is removed, viscous drag on the piston from the hydraulic fluid and the high effective inertia of the fluid in the hydraulic system results in relatively slow movement of the piston and plunger and, therefore, the slidable drive dog. This is especially the case when the hydraulic fluid ahead of the piston is cold. Accordingly, the slidable drive dog is slow to fully engage the fixed drive dog or the drive dogs will not fully engage at all.

DISCLOSURE OF THE INVENTION

A locking differential in accordance with this invention comprises a rotatable differential housing, first and second output shafts drivingly connected to the differential housing through a differential gear train, and a locking arrangement selectively locking the first and second output shafts to the differential housing. The locking arrangement includes a fixed drive dog carried by the differential housing for rotation therewith and a movable drive dog carried by one of the output shafts for rotation therewith and movable toward and away from the fixed drive dog. A locking actuator is drivingly connected to the movable drive dog for selectively moving the movable drive dog into and out of engagement with the fixed drive dog. The actuator comprises a housing and a plunger drivingly connected to the movable drive dog. The plunger is movable in a first direction to a lock position in which the movable drive dog is engaged with the fixed drive dog and in a second, opposite direction to an unlock position in which the movable drive dog is disengaged from the fixed drive dog. A piston is connected to the plunger and disposed in a cavity in the housing. Movement of the piston in the second direction is imparted to the plunger when the plunger is in the lock position but the piston is movable independently relative to the plunger in the first direction when the plunger is in the unlock position. A fluid inlet opens to the cavity at a location relative to the piston such that application of fluid under pressure into the cavity through the fluid inlet causes the piston, and thereby the plunger, to move in the second direction. A piston bias member biases the piston in the first direction, and a plunger bias member biases the plunger in the first direction.

To unlock the differential, a fluid under pressure is supplied to the cavity ahead of the piston, which overcomes the bias of the piston bias member and the plunger bias member and drives the piston and the plunger in the second direction to the unlock position in which the drive dogs are disengaged. The fluid pressure is continuously applied to maintain the plunger in the unlock position. To lock the differential, the pressure on the fluid ahead of the piston is released. As a result, the piston and plunger move in the first direction under force applied by their respective bias members until the drive dogs are moved into physical contact with one another (but typically do not mesh immediately). When the drive dogs come into contact, the motion of the plunger in the first direction is momentarily interrupted until the drive dogs rotate into proper alignment for meshing engagement. However, the piston bias member continues to act on the piston so that the piston continues to move in the first direction, thereby expelling the fluid from the housing cavity. Once the drive dogs are aligned, the plunger bias member drives the plunger further in the first direction to the lock position wherein the drive dogs mesh and fully engage one another, thereby locking the differential.

BRIEF DESCRIPTION OF THE DRAWINGS

FIGS. 3 through 6 are enlarged cross-sectional views of the locking actuator illustrated in FIGS. 1 and 2 showing the actuator at various stages in its operation.

FIG. 7 is a partially diagrammatic, partially cross-sectional view showing the actuator of FIGS. 3 through 6 and its connections to a hydraulic system.

BEST MODE FOR CARRYING OUT THE INVENTION

Figure 1:
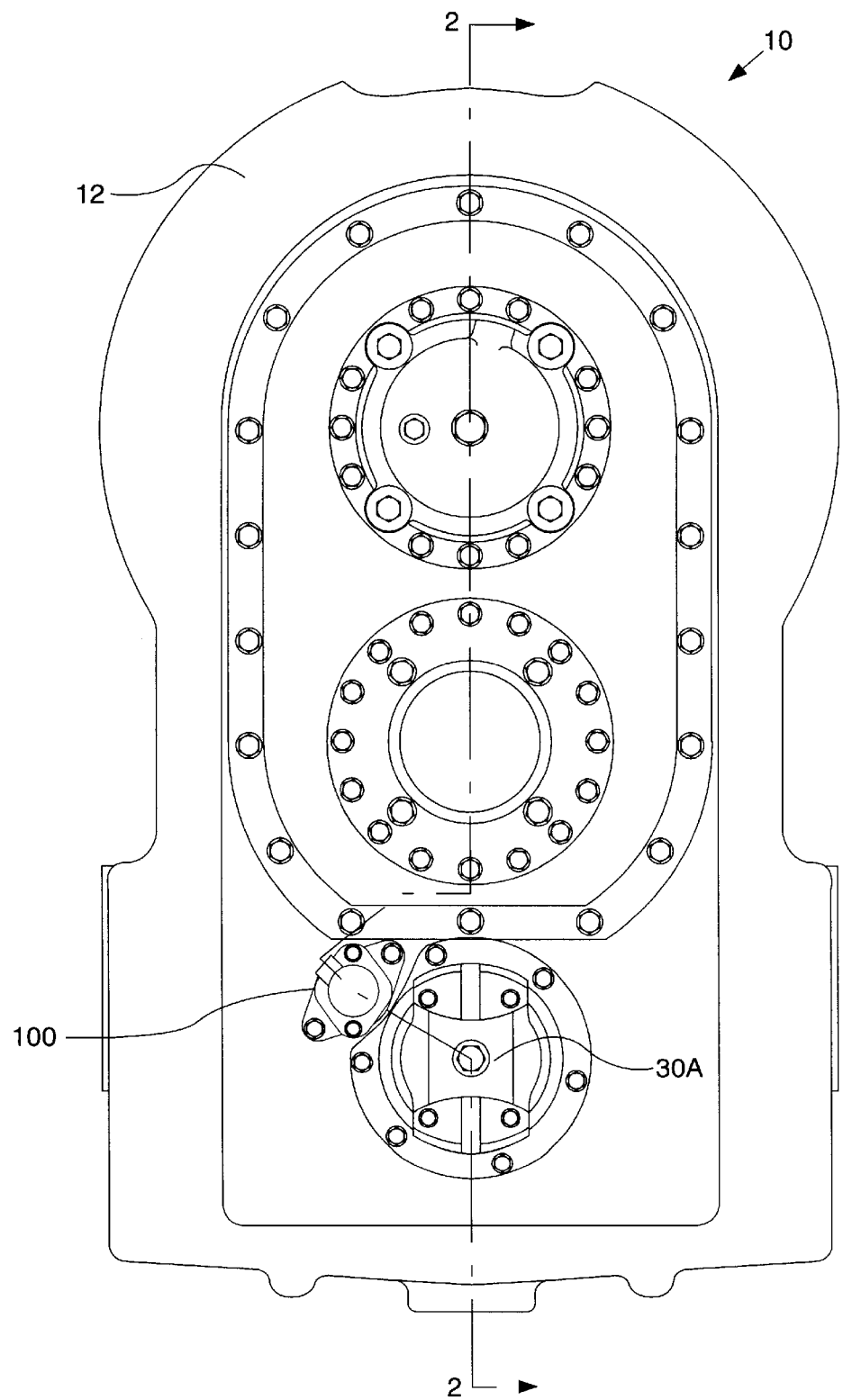
FIG. 1 is an end view of a locking differential in accordance with this invention utilizing a locking actuator in accordance with this invention.
Figure 2:
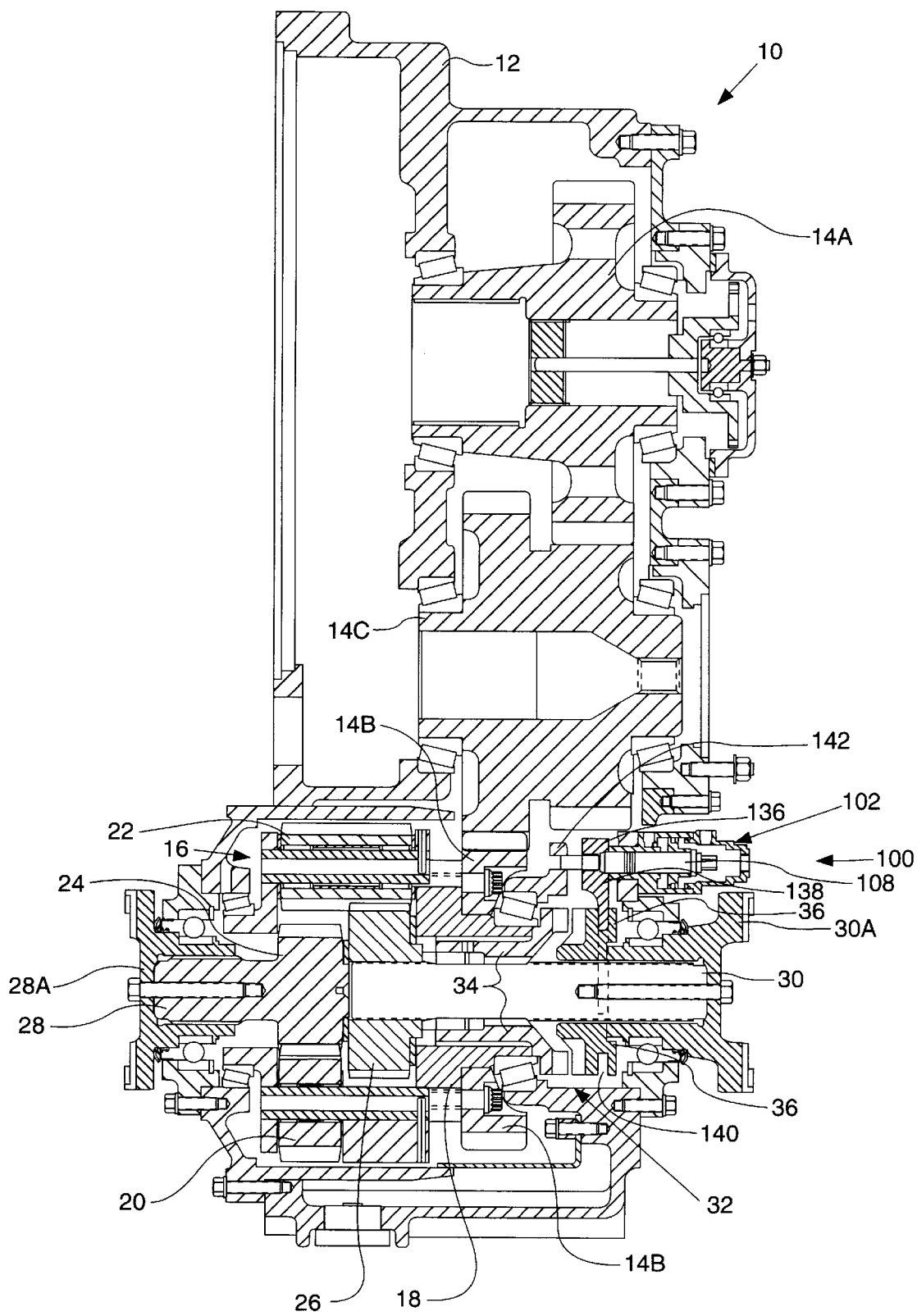
FIG. 2 is a cross-sectional view of the locking differential shown in FIG. 1 taken along line 2—2 of FIG. 1.

FIGS. 1 and 2 illustrate a locking differential, generally designated 10, in accordance with this invention for use in a wheel-driven machine (not shown), which differential 10 utilizes an actuator, generally designated 100, in accordance with this invention to lock and unlock the differential 10. The illustrated differential 10 is a spur-type differential of conventional construction well known to those skilled in the art and is, accordingly, not described in great detail herein. Moreover, the particulars of the differential 10 are not critical to an understanding of this invention, and other differential constructions may be used. Generally, however, the illustrated differential 10 includes a differential casing 12 which houses a series of gears 14A, 14B, 14C that transmit torque from an engine or other power source (not shown) to a differential mechanism, generally designated 16. More particularly, a transmission output shaft (not shown) is spline connected to an input gear 14A which drives a differential input gear 14B through an intermediate gear 14C. The differential input gear 14B is bolted and doweled to a rotatable differential housing 18 for rotation therewith. The differential housing 18 carries two interconnected trios of planet gears 20, 22 (only one planet gear 20,22 of each trio is shown) meshed with respective sun gears 24 and 26. The sun gears 24 and 26 are, in turn, connected to respective output shafts 28 and 30.

The illustrated differential 10 is a center differential wherein the output shafts 28 and 30 drive respective front and rear axles (not shown) via yokes 28A and 30A, respectively. However, it will be understood that this invention is equally applicable to differentials wherein the output shafts thereof are directly connected to ground-engaging wheels. Likewise, the illustrated differential 10 is configured to provide a 40%/60% torque split between the front and rear output shafts 28 and 30, but it will be understood that other torque splits may be used.

With continued reference to FIG. 2, the differential 10 includes a conventional dog-clutch locking arrangement, generally designated 32, which permits the output shafts 28 and 30 to be locked to the differential housing 18 to thereby neutralize normal operation of the differential 10 when surface conditions are slippery or otherwise poor. A first, fixed drive dog 34 is suitably secured to the differential housing 18 for rotation therewith. A second, slidable drive dog 36 is mounted to the rear output shaft 30 for rotation therewith but is slidable along the front output shaft 30 toward and away from the fixed drive dog 34, as by a spline connection for example. When the slidable drive dog 36 is drivingly engaged with the fixed drive dog 34, the rear output shaft 30 is locked to the differential housing 18 and necessarily rotates at the same speed as the differential housing 18. The front output shaft 28 is indirectly locked to the differential housing 18 by the interconnected planet gears 20 and 22.

With reference also to FIGS. 3 through 6, the slidable drive dog 36 is moved into and out of engagement with the fixed drive dog 34 by the aforementioned actuator 100. The actuator 100 comprises a sealed housing, generally designated 102, formed by a cylinder 104 and an adjoining end cap 106 A cylindrical plunger 108 extends within the housing 102 along the central axis of the cylinder 104 has an end portion 110 thereof projecting from the housing 102. The plunger 108 extends into a cavity 112 in the housing 102 located between first and second opposed ends 114 and 116 of the housing 102.

A cylindrical piston 118 is slidably mounted to the plunger 108 coaxially therewith and is disposed within the cavity 112 in the housing 102. Although the piston 118 is slidable along the plunger 108, the plunger 108 is provided with an annular, ring-like abutment 120 intermediate the piston and the first end 114 of the housing 102, which abutment confronts the piston 118. As a result, the piston 118 may slide relative to the plunger 118 toward the first end 114 of the housing 102 only when the piston is not engaged with the abutment 120. When the piston 118 engages the abutment 120, motion of the piston 118 is then imparted to the plunger 118 and the piston 118 and plunger 108 move together in unison. The piston 118 is, however, free to move relative to the plunger 108 toward the second end 116 of the housing 102 until it engages the confronting wall of the cavity 112. The illustrated abutment 120 is separate from the plunger 108 and secured thereto by a stud 121 threaded into the plunger 108. However, it will be understood that the abutment 120 may also be integrally-formed with the plunger 108.

With continued reference to FIGS. 3 through 6, a plunger bias member 122 in the form of a coil spring is disposed between the plunger 108 and a confronting wall 123 of the housing. Likewise, a separate piston bias member 124 in the form of a coil spring is disposed between the piston 118 and a confronting wall 125 of the housing 102. As apparent from the drawings, the piston bias member 124 is coaxial with and larger in diameter than the plunger bias member 122. The plunger bias member 122 biases the plunger 108 toward the second end 116 of the housing 112 so that the plunger 108 tends toward a fully extended position, which is best shown in FIG. 6. Similarly, the piston bias member 124 biases the piston 118 toward the first end 114 of the housing to a position engaging a wall of the cavity 112, as also best shown in FIG. 5.

Figure 3:
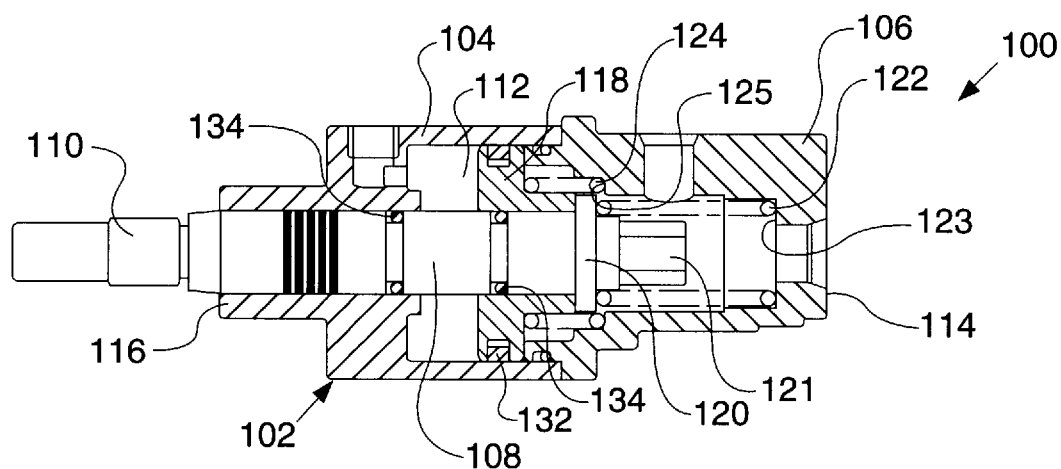

Referring also to FIG. 7, the housing 102 has a fluid inlet 126 therein which opens to the cavity 112 in the housing 102. As will be described below, hydraulic fluid, such as oil, under pressure is supplied to the cavity 102 through the inlet 126 by a conventional three-way, two position control valve, illustrated diagrammatically at 128 in FIG. 7, to overcome the bias of the bias members 122 and 124 and thereby move the plunger 108 and the piston 118 to a retracted position, which is best shown in FIG. 3. When the pressure on the fluid ahead of the piston 118 is released, the bias members 122 and 124 drive the piston 118 and plunger 108 toward the second end 116 of the housing, whereby the piston 118 expels the fluid from the cavity 112. The fluid expelled from the cavity 112 is forced through the valve 128 and back into the cavity 112 on the opposite side of the piston 118 via hydraulic lines 130, whereby the cavity 112 serves as a temporary accumulator. When pressure is applied again ahead of the piston 118, the fluid behind the piston 118 is forced out of the cavity 112 and reintroduced into the hydraulic system of the machine through hydraulic lines 130.

To prevent leakage of hydraulic fluid around the piston 118 and the plunger 108, the piston 118 is provided with an annular nylon and PTFE apex seal 132 and dual O-ring seals 134 are provided around the plunger 108. A conventional limit switch is provided at the first end 114 of the housing 102 to provide a signal indicating movement of the plunger 108 to and from its fully retracted position shown in FIG. 3.

With reference again to FIG. 2, the end portion 110 of the plunger 108 is drivingly connected, as by press-fitting, to a selector yoke 136 which is connected to the slidable drive dog 36 of the locking arrangement 32. The yoke 136 has a flange-like arm 138 that is received within an annular groove 140 in the slidable drive dog 36 so that the drive dog 136 can rotate relative to the yoke 136 but axial movement of the yoke 136 is imparted to the slidable drive dog 136. The end portion 110 of the plunger 108 extends through the yoke 136 and into a guide bearing member 142 which supports the plunger 108 and guides movement thereof.

Industrial Applicability

In operation, the differential 10 is normally used in an unlocked condition, shown in FIG. 2, in which the drive dogs 34 and 36 are disengaged by the actuator 100. To unlock the differential 10, hydraulic fluid under pressure is applied to the cavity 112 through the inlet port 126 to drive the piston 118 and thereby the plunger 108 toward the first end 114 of the housing 102 against the force of the bias members 122 and 124, as shown in FIG. 3. As evident, movement of the plunger 108, acting through the selector yoke 136, separates the drive dogs 34 and 36. Hydraulic pressure is continuously applied ahead of the piston 118 to maintain the plunger 108 in its retracted position.

Figure 4:
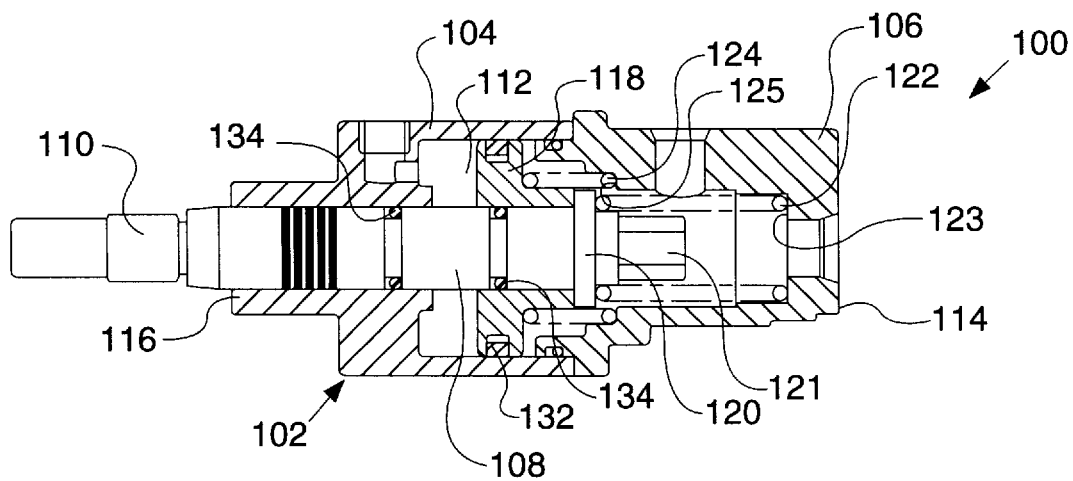

When locking of the differential is 10 desired, a machine operator releases the pressure on the fluid ahead of the piston 118, as by depressing a control switch (not shown) in the machine control cab (not shown) to control the valve 128. With hydraulic pressure removed, the bias members 122 and 124 initially drive the plunger 108 and piston 118 in unison toward the second end 116 of the housing 102 until the slidable drive dog 36 physically contacts but does not fully mesh with the fixed drive dog 34. This position of the actuator 100 is shown in FIG. 4. Movement of the plunger 108 is momentarily interrupted while the drive dogs 34 and 36 move into alignment for full, meshing engagement. However, since the piston 118 is biased by a separate bias member 124, the piston 118 continues to move and slides relative to the plunger 108, thereby creating a gap between the piston 118 and the abutment 120 on the plunger 108, as shown in FIG. 5. As a result, the piston 118 continues to expel fluid from the cavity 112 while the plunger 108 is momentarily stationary. Accordingly, when the drive dogs 34 and 36 rotate into alignment for full, meshing engagement, the plunger bias member 122 can move the plunger 108 to its fully extended position shown in FIG. 6 without working against viscous drag from the hydraulic fluid or the effective inertia of the hydraulic fluid, which results in a quick action that positively and quickly engages the drives dogs 34 and 36 to thereby lock the differential 10.

Although the presently preferred embodiments of this invention have been described, it will be understood that within the purview of the invention various changes may be made within the scope of the following claims.

What is claimed is:

1. A locking differential, comprising:
   a rotatable differential housing;
   first and second output shafts drivingly connected to said differential housing through a differential gear train;
   a locking arrangement selectively locking said first and second output shafts to said differential housing, said locking arrangement including a fixed drive dog carried by said differential housing for rotation therewith and a movable drive dog carried by one of said output shafts for rotation therewith and movable toward and away from said fixed drive dog; and
   a locking actuator drivingly connected to said movable drive dog for selectively moving said movable drive dog into and out of engagement with said fixed drive dog,
   said actuator comprising:
      a housing,
      a plunger drivingly connected to said movable drive dog, said plunger being movable in a first direction to a lock position in which said movable drive dog is engaged with said fixed drive dog and in a second, opposite direction to an unlock position in which said movable drive dog is disengaged from said fixed drive dog,
      a piston connected to said plunger and disposed in a cavity in said housing, movement of said piston in said second direction being imparted to said plunger when said plunger is in said lock position but said piston being movable independently relative to said plunger in said first direction when said plunger is in said unlock position,
      a fluid inlet opening to said cavity, said inlet being located relative to said piston such that application of fluid under pressure into said cavity through said fluid inlet causes said piston, and thereby said plunger, to move in said second direction,
      a piston bias member biasing said piston in said first direction, and
      a plunger bias member biasing said plunger in said first direction.

2. The differential of claim 1 wherein said piston bias member and said plunger bias member are separate bias members.

3. The differential of claim 1 wherein each of said bias members comprises a coil spring.

4. The differntial of claim 1 wherein said piston bias member is disposed between said piston and a confronting surface of said housing, wherein said plunger bias member is disposed between said plunger and a confronting surface of said housing.

5. The differential of claim 1 wherein said piston is coaxial with said plunger and slidable relative thereto.

6. The differential of claim 5 wherein said piston bias member is coaxial with said plunger bias member.

7. The differential of claim 1 wherein said actuator housing comprises a cylinder.

8. The differential of claim 1 wherein said piston is mounted on said plunger and slidable relative thereto.

9. The differential of claim 8 wherein said plunger is provided with an abutment confronting said piston opposite said piston from said fluid inlet, said piston engaging said abutment to impart motion to said plunger when said piston is moved in said second direction.

10. The differential of claim 9 wherein said abutment is formed by an abutment member fixed to said plunger.

11. The differential of claim 1 wherein said piston is slidably mounted on a guide member extending therethrough.

12. The differential of claim 11 wherein said guide member comprises said plunger.

13. A method for locking a differential having a fixed drive dog, a movable drive dog, and an actuator connected to said movable drive dog, said actuator having a housing, a plunger connected to said movable drive dog, said plugner being movable in a first direction to a lock position wherein said drive dogs are drivingly engaged and in a second, opposite direction to an unlock position wherein said drive dogs are disengaged, and a piston connected to said plunger, said plugner and piston being biased in a first direction toward said lock position and said piston having a fluid under pressure applied ahead thereof to maintain said plunger in said unlock position, said method comprising the steps of:
   providing a connection between said plunger and said piston such that said piston can move independently relative to said plunger in said first direction when said plunger is in said unlock position;

removing pressure on the fluid ahead of said piston;

causing said piston to move in said first direction independently of said plunger; and thereafter, causing said plunger to move in said first direction to said lock position, whereby said plunger drives said movable drive dog into driving engagement with said fixed drive dog to thereby lock said differential.

14. The method of claim 13 wherein said step of causing said piston to move in said first direction is accomplished by force applied to said piston by a bias member disposed between said piston and a confronting surface of said actuator housing.

15. The method of claim 14 wherein said step of causing said plunger to move in said first direction is accomplished by force applied to said plunger by a bias member disposed between said plunger and a confronting surface of said actuator housing.

16. The method of claim 13 wherein said piston is mounted on said plunger and slidable relative thereto.

17. The method of claim 13 wherein said step of causing said plunger to move in said first direction causes said plunger to move relative to said piston.

18. The method of claim 13 wherein said plunger is provided with an abutment engaged with said piston when said plunger is in said unlock position, and wherein said step of causing said piston to move independently of said plunger creates a gap between said plunger and said abutment.

19. The method of claim 18 wherein said step of causing said plunger to move in said first direction causes said plunger to move relative to said piston, thereby reducing the gap between said piston and said abutment.

20. A locking actuator for a differntial having a differential housing, a fixed drive dog mounted to said differential housing for rotation therewith, and a movable drive dog mounted to one of a pair of differential output shafts for rotation therewith, said actuator for moving said movable drive dog into and out of engagement with said fixed drive dog, said actuator comprising:

a hollow actuator housing having and first and second opposed ends;

a plunger extending within said actuator housing and movable relative thereto, said plunger having a portion thereof projecting from said actuator housing for driving connection to the movable drive dog of a locking differential;

a piston connected to said plunger and disposed within a cavity in said actuator housing for movement therein, movement of said piston toward the first end of said actuator housing being imparted to said plunger but said piston being movable independently relative to said plunger in a direction toward the second, opposite end of said actuator housing;

a fluid port opening to said cavity intermediate said piston and the second end of said actuator housing;

a piston bias member biasing said piston toward the second en of said actuator housing; and a plunger bias member biasing said plunger toward the second end of said actuator housing.

21. The actuator of claim 20 wherein said piston is mounted on said plugner and slidable relative thereto.

22. The actuator of claim 21 wherein said plunger is provided with an abutment confronting said piston intermediate said piston and the first end of said actuator housing, said piston engaging said abutment to impart motion to said plunger when said piston is moved toward the first end of said actuator housing.

23. The actuator of claim 22 wherein said abutment is formed by an abutment member fixed to said plunger.

24. The actuator of claim 20 wherein said projecting portion of said plunger projects from the second end of said actuator housing.

* * * * *

UNITED STATES PATENT AND TRADEMARK OFFICE
CERTIFICATE OF CORRECTION

PATENT NO. : 5,882,272
DATED : March 16, 1999
INVENTOR(S) : Nathan (NMI) Allonby It is certified that error appears in the above-identified patent and that said Letters Patent is hereby corrected as shown below:

Column 6, line 28, insert --wherein said plunger extends within said housing, and-- after "housing,"
Column 6, line 54, delete "plugner" and insert --plunger--
Column 6, line 59, delete "plugner" and insert --plunger--
Column 8, line 20, delete "en" and insert --end--
Column 8, line 24, delete "plugner" and insert --plunger--

Signed and Sealed this

Twentieth Day of July, 1999

Attest:

Attesting Officer

Q. TODD DICKINSON

Acting Commissioner of Patents and Trademarks